United States Patent vor der Brück et al.

[11] 4,324,723
[45] Apr. 13, 1982

[54] MONOAZO DYESTUFFS

[75] Inventors: Dieter vor der Brück, Bonn; Gerhard Wolfrum, Leverkusen, both of Fed. Rep. of Germany

[73] Assignee: Bayer Aktiengesellschaft, Leverkusen, Fed. Rep. of Germany

[21] Appl. No.: 77,501

[22] Filed: Sep. 20, 1979

[30] Foreign Application Priority Data

Oct. 5, 1978 [DE] Fed. Rep. of Germany ....... 2843475

[51] Int. Cl.³ ................... C07C 107/06; C09B 29/085; C09B 29/26
[52] U.S. Cl. .................................. 260/207.1; 260/207
[58] Field of Search ................. 260/207, 207.1; 8/41 B

[56] References Cited

U.S. PATENT DOCUMENTS

| | | | |
|---|---|---|---|
| 3,637,653 | 1/1972 | von Brechel et al. | 260/207.1 X |
| 3,644,329 | 2/1972 | Le Roy et al. | 260/207.1 |
| 3,836,518 | 9/1974 | Clark | 260/207.1 X |
| 4,087,420 | 5/1978 | Heinrich et al. | 260/207 |
| 4,115,381 | 9/1978 | Ramanathan | 260/207.1 |
| 4,187,218 | 2/1980 | Merlo et al. | 260/207.1 X |

FOREIGN PATENT DOCUMENTS 1275625 5/1972 United Kingdom .
1422065 1/1976 United Kingdom .

*Primary Examiner*—Charles F. Warren
*Attorney, Agent, or Firm*—Sprung, Felfe, Horn, Lynch & Kramer

[57] ABSTRACT

Monoazo dyestuffs which, in the form of the free acid, correspond to the formula

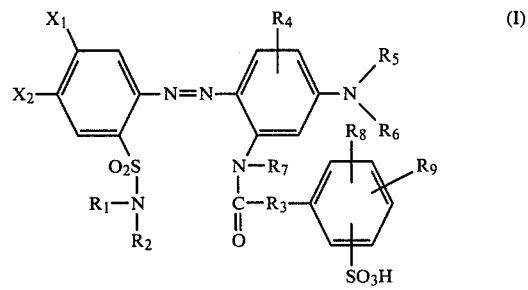

in which $X_1$ and $X_2$ denote chlorine, bromine or trifluoromethyl,
$R_1$ denotes hydrogen or $C_1$-$C_8$-alkyl, which can be substituted by hydroxyl,
$R_2$ denotes hydrogen, $C_1$-$C_4$-alkoxy-$C_1$-$C_4$-alkyl, $C_1$-$C_{13}$-alkyl, phenyl which is optionally substituted by methyl, ethyl, chlorine, methoxy or ethoxy, benzyl, phenethyl, cyclohexyl or methylcyclohexyl,
$R_3$ denotes a direct bond, methylene, ethylene, methyleneoxy, methyleneoxycarbonyl, methyleneoxycarbonylamino, —O—, —NH—, aminomethylene or aminoethylene,
$R_4$ denotes hydrogen, methyl, methoxy or ethoxy,
$R_5$ and $R_6$ denote $C_1$-$C_4$-alkyl, which can be further substituted by cyano, chlorine, $C_1$-$C_4$-alkoxy, $C_1$-$C_4$-alkoxycarbonyloxy, $C_1$-$C_4$-alkylcarbonyloxy or phenylaminocarbonyloxy, benzyl or phenethyl,
$R_7$ denotes hydrogen or $C_1$-$C_4$-alkyl, and
$R_8$ and $R_9$ denote hydrogen, chlorine, methyl, ethyl, methoxy, ethoxy, trifluoromethyl or cyano, a process for their preparation and their use for dyeing natural and synthetic fibre materials.

2 Claims, No Drawings

MONOAZO DYESTUFFS

The invention relates to monoazo dyestuffs which, in the form of the free acid, correspond to the formula

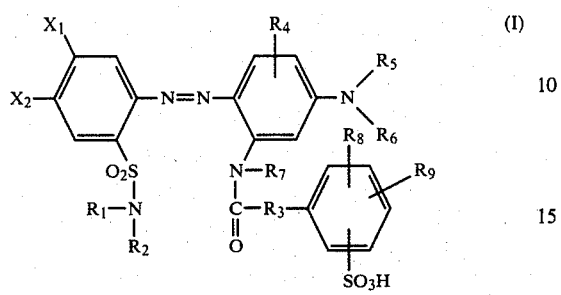

in which
$X_1$ and $X_2$ denote chlorine, bromine or trifluoromethyl,
$R_1$ denotes hydrogen or $C_1$–$C_8$-alkyl, which can be substituted by hydroxyl,
$R_2$ denotes hydrogen, $C_1$–$C_4$-alkoxy-$C_1$–$C_4$-alkyl, $C_1$–$C_{13}$-alkyl, phenyl which is optionally substituted by methyl, ethyl, chlorine, methoxy or ethoxy, benzyl, phenethyl, cyclohexyl or methylcyclohexyl,
$R_3$ denotes a direct bond, methylene, ethylene, methyleneoxy, methyleneoxycarbonyl, methyleneoxycarbonylamino, -O-, -NH-, aminomethylene or aminoethylene,
$R_4$ denotes hydrogen, methyl, methoxy or ethoxy,
$R_5$ and $R_6$ denote $C_1$–$C_4$-alkyl, which can be further substituted by cyano, chlorine, $C_1$–$C_4$-alkoxy, $C_1$–$C_4$-alkoxycarbonyloxy, $C_1$–$C_4$-alkylcarbonyloxy or phenylaminocarbonyloxy, benzyl or phenethyl,
$R_7$ denotes hydrogen or $C_1$–$C_4$-alkyl, and
$R_8$ denote hydrogen, chlorine, methyl, ethyl, methoxy, ethoxy, trifluoromethyl or cyano.

Preferred dyestuffs are those which, in the form of the free acid, correspond to the formula

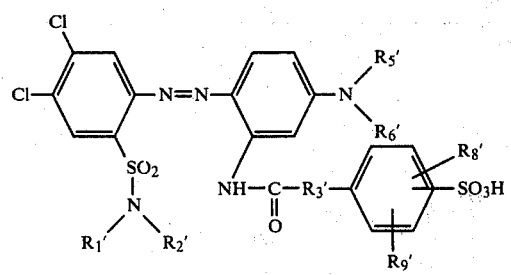

wherein
$R_1'$ represents $C_1$–$C_4$-alkyl or hydrogen,
$R_2'$ represents $C_1$–$C_{12}$-alkyl, phenyl which is optionally substituted by methyl, ethyl, chlorine, methoxy or ethoxy, benzyl, phenethyl, cyclohexyl or methylcyclohexyl,
$R_5'$ represents methyl or ethyl,
$R_6'$ represents methyl, ethyl or cyanoethyl,
$R_8'$ represents hydrogen or chlorine,
$R_9'$ represents hydrogen, chlorine, methyl, methoxy or ethoxy, and
$R_3'$ represents a direct bond, $$-\underset{H}{N}-, -CH_2- \text{ or } -CH_2-O-.$$

The new dyestuffs are prepared by diazotising an amine of the formula

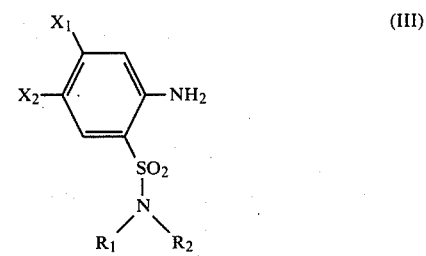

in which
$X_1$, $X_2$, $R_1$ and $R_2$ have the meaning indicated above, and coupling the diazotisation product to coupling components of the formula

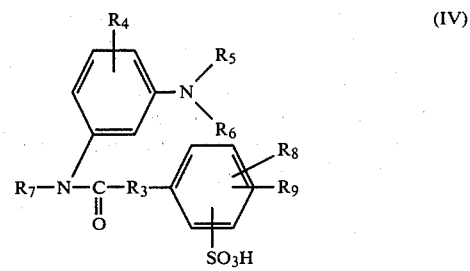

wherein
$R_3$, $R_4$, $R_5$, $R_6$, $R_7$, $R_8$ and $R_9$ have the meaning indicated above.

The dyestuffs according to the invention are suitable for dyeing natural and synthetic fibre materials, in particular for dyeing polyamide fibres, in level, deep red shades, in particular yellowish-tinged red shades, of very good fastness to light and to wet processing. The new dyestuffs put an expert in the position of being able to produce interesting red shades by combination with, in particular, dyestuffs which dye in bluish-tinged red shades.

The new dyestuffs are already absorbed well onto polyamide fibres in a neutral to weakly acid dyebath. By polyamide fibers there are understood in this context, in particular, those of synthetic polyamides, such as ε-polycaprolactam or condensation products of adipic acids and hexamethylenediamine. The dyestuffs are used either in the form of the free acids or in the form of their salts, in particular their alkali metal salts, preferably the sodium salts or potassium salts, and their ammonium salts.

EXAMPLE 1

4.8 g of 3,4-dichloro-6-(N-methyl-N-phenylaminosulphonyl)-aniline are dissolved in 100 ml of glacial acetic acid and 30 ml of concentrated HCl. The solution is cooled to 0° C. The amine is diazotised with 10 ml of a 10% strength NaNO₂ solution and the mixture is subsequently stirred at 0° C. for two hours.

3.6 g of 3-(2-chloro-4-sulphophenoxyacetylamino)-N,N-diethylaniline are introduced into 100 g of ice and 100 g of water. The diazonium salt solution described above is allowed to run into this suspension, and the pH is adjusted to about 4 with sodium acetate solution. The dyestuff of the formula

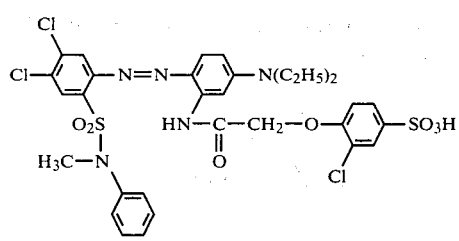

which has precipitated is filtered off and dried at about 50° C.

EXAMPLE 2

5 g of 3,4-dichloro-6-(diisobutylaminosulphonyl)-aniline are diazotised with 10 ml of a 10% strength NaNO$_2$ solution in 100 ml of glacial acetic acid and 30 ml of concentrated hydrochloric acid at 0° C. The mixture is subsequently stirred at 0° C. for 2 hours.

2.7 g of 3-(sulphophenylacetylamino)-diethyl-aniline are dissolved in 30 ml of 1 N sodium hydroxide solution and the solution is introduced into 100 g of ice and 100 g of H$_2$O. The diazonium salt solution described above is allowed to run into this mixture at 0° C. The pH value is then adjusted to about 4 with sodium acetate solution. The dyestuff of the formula

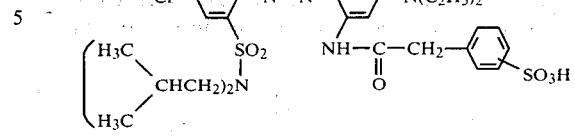

which has precipitated is filtered off and dried at 50° C.

DYEING EXAMPLE 0.1 g of the dyestuff from Example 1 is dissolved hot in 100 ml of water, 5 ml of 10% strength ammonium acetate solution are added and the mixture is diluted to a volume of 500 ml with H$_2$O. 10 g of polyamide fibres are introduced into the dyebath, the dyebath is brought to the boiling point in the course of 20 minutes, 4 ml of 10% strength acetic acid are added and the bath is boiled for one hour. The fibres are then rinsed and dried at 70° to 80° C. A dyeing is obtained with a yellowish-tinged red shade and with good fastness properties in use, in particular with very good fastness to wet processing.

If the procedure followed is as in Example 1 and 2, using the appropriate diazo components and coupling components, further dyestuffs of the general formula

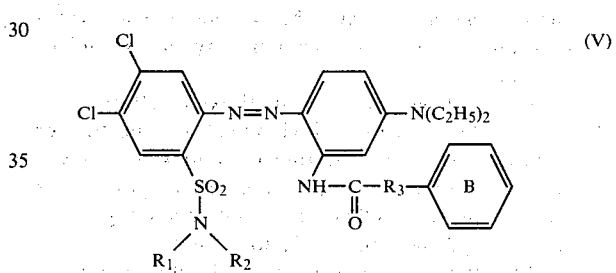

are obtained.

| Example No. | R$_1$ | R$_2$ | R$_3$ | Substituent in B | Colour shade on polyamide |
|---|---|---|---|---|---|
| 3 | Ethyl | Phenyl | —CH$_2$—O— | 2-Chloro-4-sulpho | yellowish-tinged red |
| 4 | Methyl | Benzyl | " | " | " |
| 5 | iso-Butyl | iso-Butyl | " | " | " |
| 6 | H | Hexyl | " | " | " |
| 7 | H | Hexyl | " | 2,4-Dichloro-X-sulpho | " |
| 8 | H | Cyclohexyl | " | 2,4-Dichloro-X-sulpho | " |
| 9 | Methyl | Phenyl | " | 2,4-Dichloro-X-sulpho | " |
| 10 | Ethyl | Phenyl | " | 2,4-Dichloro-X-sulpho | " |
| 11 | Methyl | Cyclohexyl | " | 2,4-Dichloro-X-sulpho | " |
| 12 | Methyl | Benzyl | " | 2,4-Dichloro-X-sulpho | " |
| 13 | Ethyl | Ethyl | " | 2,4-Dichloro-X-sulpho | " |
| 14 | Butyl | Butyl | " | 2,4-Dichloro-X-sulpho | " |
| 15 | Butyl | Butyl | " | 2-Methyl-4-chloro-X-sulpho | " |
| 16 | Methyl | Benzyl | " | 2-Methyl-4-chloro-X-sulpho | " |
| 17 | Methyl | Cyclohexyl | " | 2-Methyl-4-chloro-X-sulpho | " |
| 18 | H | Butoxypropyl | " | 4-Sulpho | " |
| 19 | Ethyl | Phenyl | " | " | " |
| 20 | Methyl | Benzyl | " | " | " |

-continued

| Example No. | $R_1$ | $R_2$ | $R_3$ | Substituent in B | Colour shade on polyamide |
|---|---|---|---|---|---|
| 21 | Ethyl | Ethyl | " | " | " |
| 22 | iso-Butyl | iso-Butyl | " | " | " |
| 23 | Methyl | Cyclohexyl | " | " | " |
| 24 | Methyl | Octyl | " | " | " |
| 25 | Ethyl | Phenyl | " | 4-Methyl-X-sulpho | " |
| 26 | Methyl | Phenylethyl | " | " | " |
| 27 | H | Phenylethyl | " | " | " |
| 28 | Methyl | 2-Chlorophenyl | " | " | " |
| 29 | H | Hexyl | " | " | " |
| 30 | Methyl | 4-Methoxyphenyl | " | " | " |
| 31 | Ethyl | Ethyl | " | " | " |
| 32 | Ethyl | Phenyl | — | 4-Methoxy-3-sulpho | red |
| 33 | Methyl | " | — | " | " |
| 34 | Methyl | Cyclohexyl | — | " | " |
| 35 | Methyl | Benzyl | — | " | " |
| 36 | Methyl | Benzyl | — | 3-Sulpho | yellowish-tinged red |
| 37 | Methyl | Cyclohexyl | — | " | " |
| 38 | Methyl | Phenyl | — | " | " |
| 39 | Ethyl | " | — | " | " |
| 40 | H | Cyclohexyl | — | " | " |
| 41 | H | Octyl | — | " | " |
| 42 | Methyl | Phenyl | — | 2-Sulpho | scarlet |
| 43 | Ethyl | Phenyl | — | " | " |
| 44 | Methyl | Benzyl | — | " | " |
| 45 | " | Cyclohexyl | — | " | " |
| 46 | " | 4-Methylphenyl | — | " | " |
| 47 | " | 2-Methoxyphenyl | — | " | " |
| 48 | " | Phenyl | —NH— | 4-Sulpho | red |
| 49 | " | Cyclohexyl | " | " | " |
| 50 | " | 4-Methylphenyl | " | 4-Methoxy-3-sulpho | " |
| 51 | Butyl | 3-Chlorophenyl | " | 4-Chloro-4-sulpho | " |
| 52 | β-Hydroxy-ethyl | 4-Ethylphenyl | " | 2-Methyl-4-sulpho | " |
| 53 | Ethyl | Phenyl | —O— | 4-Sulpho | yellowish-tinged red |

The following table lists examples of other dyestuffs which can be obtained by coupling a diazotised amine of the formula

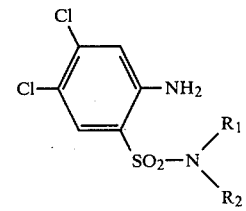

in which
$R_1$ and $R_2$ have the meaning indicated in the table, to the coupling components also indicated.

| Example | $R_1$ | $R_2$ | Coupling component | Colour shade on polyamide |
|---|---|---|---|---|
| 54 | —CH₃ | —C₃H₆—O—C₄H₉ | (phenyl with N(C₂H₄CN)(C₂H₅), NH—CO—, OCH₃, SO₂H) | yellowish-tinged red |
| 55 | —C₄H₉ | —C₄H₉ | (phenyl with N(CH₃)₂, HN—CO—CH₂—, CH₃, SO₃H) | " |

-continued

| Example | $R_1$ | $R_2$ | Coupling component | Colour shade on polyamide |
|---|---|---|---|---|
| 56 | —$CH_3$ | 2,4-dimethylphenyl | 3-[N($C_2H_4$—O—CO—$CH_3$)$_2$]-phenyl with HN—CO—$CH_2$—(4-$SO_3H$-phenyl) | '' |
| 57 | —$C_2H_5$ | phenyl | 3-[N($C_2H_4$—O—CO—NH—phenyl)$_2$]-phenyl with HN—CO—(2-O—$CH_3$, 3-$SO_3H$)-phenyl | '' |
| 58 | —$CH_3$ | 3-ethoxyphenyl | 3-N($CH_3$)$_2$-phenyl with HN—CO—$CH_2$—O—(2-$SO_3H$, 3,5-$Cl_2$)-phenyl | '' |
| 59 | H | —$C_2H_4$—phenyl | 3-[N($C_2H_4$—O—$C_4H_9$)$_2$]-phenyl with HN—CO—$CH_2$—O—(2-Cl, 3-$CH_3$, 4-$SO_3H$)-phenyl | '' |
| 60 | —$CH_3$ | —$CH_2$—phenyl | 3-[N($C_2H_4$—O—$CH_3$)$_2$]-phenyl with HN—CO—(2-O$C_2H_5$, 3-$SO_3H$)-phenyl | '' |
| 61 | —$C_2H_4$—OH | phenyl | 3-[N($C_2H_4$—O—CO—$C_4H_9$)$_2$]-phenyl with HN—CO—$CH_2$—O—(4-$SO_3H$)-phenyl | '' |
| 62 | $CH_3$— | phenyl-$C_2H_4$— | 3-[N($C_2H_4$—O—CO—O—$C_2H_5$)$_2$]-phenyl with HN—CO—$CH_2$—(4-$SO_3H$-phenyl) | '' |
| 63 | $C_3H_7$ | 2,5-dimethoxy-4-methylphenyl | 3-[N($C_2H_5$)($C_2H_4$—O—CO—O—$CH_3$)]-phenyl with HN—CO—(3-$SO_3H$)-phenyl | scarlet |
| 64 | $C_2H_5$ | $C_4H_9$ | 3-N($C_2H_5$)$_2$-phenyl with HN—CO—$C_2H_4$—(3-$SO_3H$-phenyl) | yellowish-tinged red |
| 65 | H | $H_3C$—$(CH_2)_{12}$ | 3-N($C_2H_5$)$_2$-phenyl with HN—CO—NH—$CH_2$—(4-$SO_3H$-phenyl) | '' |

-continued

| Example | R₁ | R₂ | Coupling component | Colour shade on polyamide |
|---|---|---|---|---|
| 66 | C₂H₅ |  | 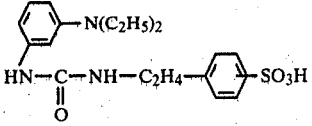 | red |
| 67 | H |  | 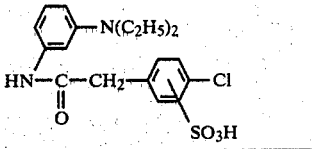 | yellowish-tinged red |

Other preferred dyestuffs can be obtained by diazotising amines of the formula

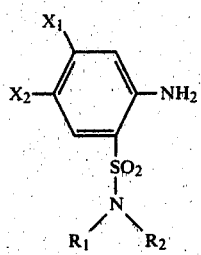

wherein
$X_1$, $X_2$, $R_1$ and $R_2$ have the meanings indicated in the table which follows, and coupling the diazotisation products to the coupling components likewise listed in the table.

| Example | X₁ | X₂ | R₁ | R₂ | Coupling component | Colour shade on polyamide |
|---|---|---|---|---|---|---|
| 68 | Cl | CF₃ | CH₃ |  | 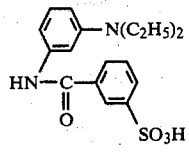 | yellowish-tinged red |
| 69 | Cl | CF₃ | CH₃ |  | 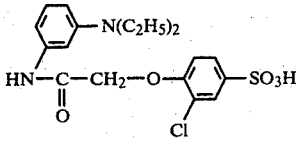 | yellowish-tinged red |
| 70 | Cl | CF₃ | CH₃ |  | " | yellowish-tinged red |
| 71 | Cl | CF₃ | CH₃ |  | 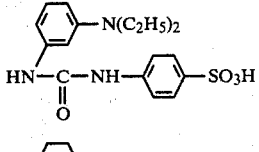 | red |
| 72 | Cl | CF₃ | H |  | 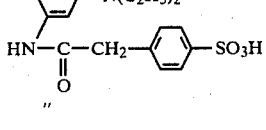 | yellowish-tinged red |
| 73 | Cl | Br | C₄H₉ | C₄H₉ | " | yellowish-tinged red |
| 74 | CF₃ | Br | CH₃ |  | 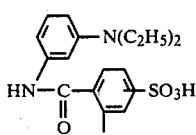 | yellowish-tinged red |

| Example | $X_1$ | $X_2$ | $R_1$ | $R_2$ | Coupling component | Colour shade on polyamide |
|---|---|---|---|---|---|---|
| 75 | $CF_3$ | Br | $CH_3$ | | | red |
| 76 | $CF_3$ | Cl | H | | | yellowish-tinged red |
| 77 | Cl | Cl | $CH_3$ | | | yellowish-tinged red |

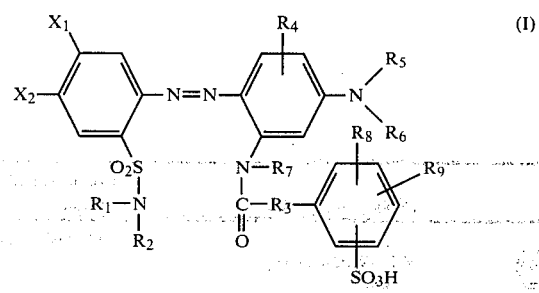

I claim:

1. Monoazo dyestuffs which, in the form of the free acid, correspond to the formula

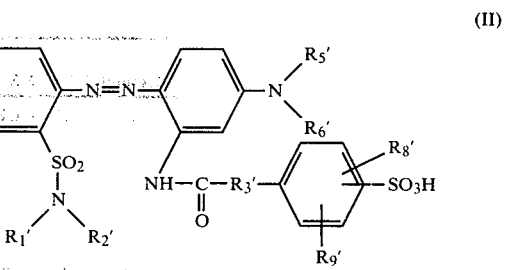

in which $X_1$ and $X_2$ denote chlorine, bromine or trifluoromethyl, $R_1$ denotes hydrogen or $C_1-C_8$-alkyl, which can be substituted by hydroxyl, $R_2$ denotes hydrogen, $C_1-C_4$-alkoxy-$C_1-C_4$-alkyl, $C_1-C_{13}$-alkyl, phenyl which is optionally substituted by methyl, ethyl, chlorine, methoxy or ethoxy, benzyl, phenethyl, cyclohexyl or methylcyclohexyl, $R_3$ denotes a direct bond, methylene, ethylene, methyleneoxy, methyleneoxycarbonyl, methyleneoxycarbonylamino, aminomethylene or aminoethylene, $R_4$ denotes hydrogen, methyl, methoxy or ethoxy, $R_5$ and $R_6$ denote $C_1-C_4$-alkyl, which can be further substituted by cyano, chlorine, $C_1-C_4$-alkoxy, $C_1-C_4$-alkoxycarbonyloxy, $C_1-C_4$-alkylcarbonyloxy or phenylaminocarbonyloxy, benzyl or phenethyl, $R_7$ denotes hydrogen or $C_1-C_4$-alkyl, and $R_8$ and $R_9$ denote hydrogen, chlorine, methyl, ethyl, methoxy, ethoxy, trifluoromethyl or cyano.

2. Monoazo dyestuffs according to claim 1, which, in the form of the free acid, correspond to the formula wherein $R_1'$ represents $C_1-C_4$-alkyl or hydrogen, $R_2'$ represents $C_1-C_{12}$-alkyl, phenyl which is optionally substituted by methyl, ethyl, chlorine, methoxy or ethoxy, benzyl, phenethyl, cyclohexyl or methylcyclohexyl, $R_5'$ represents methyl or ethyl, $R_6'$ represents methyl, ethyl or cyanoethyl, $R_8'$ represents hydrogen or chlorine, $R_9'$ represents hydrogen, chlorine, methyl, methoxy or ethoxy, and $R_3'$ represents a direct bond, —$CH_2$— or —$CH_2$—O—.

* * * * *